(12) United States Patent
Lindner (10) Patent No.: US 10,871,418 B2
(45) Date of Patent: Dec. 22, 2020

(54) METHOD OF ANALYZING SPRAY PARTICULATES THROUGH A TRANSPARENT SIDEWALL

(71) Applicant: Croda, Inc., Edison, NJ (US)

(72) Inventor: Gregory James Lindner, Wilmington, DE (US)

(73) Assignee: Croda, Inc., Edison, NJ (US)

( * ) Notice: Subject to any disclaimer, the term of this patent is extended or adjusted under 35 U.S.C. 154(b) by 305 days.

(21) Appl. No.: 15/571,325

(22) PCT Filed: May 9, 2016

(86) PCT No.: PCT/US2016/031442
§ 371 (c)(1),
(2) Date: Nov. 2, 2017

(87) PCT Pub. No.: WO2016/182992
PCT Pub. Date: Nov. 17, 2016

(65) Prior Publication Data
US 2018/0143100 A1 May 24, 2018

Related U.S. Application Data

(60) Provisional application No. 62/160,287, filed on May 12, 2015.

(51) Int. Cl.
*G01M 9/04* (2006.01)
*G01N 15/02* (2006.01)
(Continued)

(52) U.S. Cl.
CPC .......... *G01M 9/04* (2013.01); *G01N 15/0205* (2013.01); *G01N 15/0227* (2013.01);
(Continued)

(58) Field of Classification Search
None
See application file for complete search history.

(56) References Cited

U.S. PATENT DOCUMENTS 2,592,322 A 4/1952 Nerad
3,111,842 A 11/1963 Fredette et al.
(Continued)

FOREIGN PATENT DOCUMENTS

WO 2014040119 A1 3/2014
WO 2014107327 A1 7/2014

OTHER PUBLICATIONS

Fritz et al., "Evaluation of the EPA Drift Reduction Technology (DRT) Low-speed Wind Tunnel Protocol," 2009, pp. 1-11, vol. 6, No. 4, Journal of ASTM International.
(Continued)

*Primary Examiner* — Natalie Huls
*Assistant Examiner* — Jermaine L Jenkins
(74) *Attorney, Agent, or Firm* — RatnerPrestia (57) ABSTRACT

A wind tunnel and method of use thereof. The wind tunnel has an airflow system which is capable of delivering air vertically down through, and optionally horizontally across, a spray chamber having transparent sidewalls, wherein spray particulates produced in the spray chamber can be analyzed through the transparent sidewalls, preferably by use of a laser. The dimensions of the spray chamber are preferably greater than that of the airflow system. The use of the wind tunnel enables a wider range and more accurate spray particle measurements, especially for an agrochemical composition, to be made in a single test environment.

20 Claims, 7 Drawing Sheets

(51) Int. Cl.
  *G01N 15/14* (2006.01)
  *G01N 15/10* (2006.01)
(52) U.S. Cl.
  CPC ..... *G01N 15/1459* (2013.01); *G01N 15/1463* (2013.01); *G01N 2015/1087* (2013.01); *G01N 2015/1493* (2013.01)

(56) References Cited

U.S. PATENT DOCUMENTS

| | | | |
|---|---|---|---|
| 3,456,503 | A | 7/1969 | Wise |
| 3,739,634 | A | 6/1973 | Johnson et al. |
| 4,033,185 | A | 7/1977 | McNally et al. |
| 4,648,267 | A | 3/1987 | Seegmiller |
| 5,550,224 | A | 8/1996 | Hazen |
| 5,824,797 | A | 10/1998 | Hazen |
| 5,874,096 | A | 2/1999 | Hazen |
| 5,942,682 | A | 8/1999 | Ghetzler et al. |
| 7,028,542 | B2 | 4/2006 | Metni |
| 7,156,744 | B2 | 1/2007 | Metni et al. |
| 7,666,242 | B2 | 2/2010 | Gednalske et al. |
| 7,772,579 | B2 * | 8/2010 | Herzog .............. G01P 5/20 250/222.2 |
| 8,650,944 | B2 | 2/2014 | Meis et al. |
| 8,689,619 | B2 | 4/2014 | Spandl et al. |
| 8,695,360 | B2 * | 4/2014 | Enis .............. B01D 5/0027 62/74 |
| 9,034,960 | B2 * | 5/2015 | Brown .............. A01N 57/20 524/188 |
| 9,098,732 | B2 * | 8/2015 | Magidow .............. G06F 3/0482 |
| 9,116,068 | B2 | 8/2015 | Spandl et al. |
| 9,327,202 | B2 * | 5/2016 | Lurie .............. A63G 31/00 |
| 2010/0037653 | A1 | 2/2010 | Enis et al. |
| 2012/0060536 | A1 * | 3/2012 | Ahonen .............. B05B 1/26 62/304 |
| 2013/0180325 | A1 | 7/2013 | Spandl et al. |
| 2013/0244877 | A1 | 9/2013 | Lindner |
| 2013/0252817 | A1 * | 9/2013 | Shao .............. A01N 57/20 504/206 |
| 2014/0182367 | A1 | 7/2014 | Spandl et al. |
| 2015/0237851 | A1 | 8/2015 | Drew |
| 2015/0346052 | A1 | 12/2015 | Spandl et al. |

OTHER PUBLICATIONS

Gabriels et al., "The I.C.E. Wind Tunnel for Wind and Water Erosion Studies", Soil Technology 10, (1997) pp. 1-8.
Guler et al., "Wind Tunnel Evaluation of Drift Reduction Potential and Spray Characteristics with Draft Retardants at High Operating Pressure", Journal of ASTM International, (2006), vol. 5, No. 5, pp. 1-9 (Abstract Only).
Herbst et al., "Classification of Sprayers According to Drift Risk—A German Approach", Aspects of Applied Biology, vol. 57, (2000), pp. 35-40.
Herbst et al., "A Method to Determine Spray Drift Potential from Nozzles and its Link to Buffer Zone Restrictions", 2001 ASAE Annual International Meeting, Sacramento, CA, Jul. 30-Aug. 1, 2001—10 Pages.
Hoffman et al., "Spray Adjuvant Effects on Droplet Size Spectra Measured by Three Laser-Based Systems in a High-Speed Wind Tunnel", Journal of ASTM International, vol. 5, No. 6, (2008), pp. 1-12 (Abstract only).
International Search Report and Written Opinion for International Application No. PCT/US2016/31442, dated Jul. 27, 2016—11 Pages.
LeBeau et al., Wind Tunnel Protocol for Spray Drift Assessment, Parasitica, (2006), (1-2), pp. 22-40.
Lindgren et al., "Design and Evaluation of a Low-speed Wind Tunnel with Expanding Corners", Technical reports from Royal Institute of Technology, Stockholm, Sweden, Oct. 2002, pp. 1-43.
Mehta et al., "Design Rules for Small Low Speed Wind Tunnels", The Aeronautical Journal of the Royal Aeronautical Society, Nov. 1979, pp. 443-449.
US EPA Generic Verification Protocol for the Verification of Pesticide Spray Drift Reduction Technologies for Row and Field Crops EPA, p. 57, Final Version, Dated Jun. 2016.
Draft Generic Verification Protocol for the Verification of Pesticide Spray Drift Reduction Technologies for Row and Field Crops EPA, p. 59, Draft Version (Publication date unknown).
International Preliminary Report on Patentability for International Application No. PCT/US2016/031442, dated Nov. 14, 2017, 9 pages.

* cited by examiner

FIG. 7

METHOD OF ANALYZING SPRAY PARTICULATES THROUGH A TRANSPARENT SIDEWALL

CROSS REFERENCE TO RELATED APPLICATIONS

This application is the National Stage filing of International Appln. No. PCT/US2016/031442, filed 9 May 2016, and claims priority of U.S. Provisional Application No. 62/160,287, filed 12 May 2015, the entirety of which applications is incorporated herein by reference for all purposes.

FIELD OF INVENTION

The present invention relates to a method of analyzing spray particulates in a wind tunnel, particularly for agrochemical spray analysis, and to a wind tunnel.

BACKGROUND

Due to increasing concerns about controlling pests and to the environmental pollution associated with agrochemical sprays, application of such sprays requires precision. One issue is spray drift where the agrochemical spray reaches areas other than the intended crop. Spray drift can result in the pollution of water and cause damage to the health of human beings, creatures and other plants. A great deal of research has been conducted on spray drift, but it remains a significant problem associated with many agrochemical spray applications.

Field tests can provide information on factors influencing spray drift. However, field tests are limited by weather conditions that cannot be controlled and often vary during a test. Laboratory tests have been used to evaluate drift associated with agrochemical sprays and are normally carried out in wind tunnels where conditions can be tightly controlled, for example to provide for the aerodynamic flow of air and spray particulates. There are 2 basic types of wind tunnels—open circuit or closed circuit (or closed loop). Closed systems are normally preferred where the escape of potentially toxic pesticide spray can be prevented. Both open and closed system wind tunnels have been widely used for many years to analyze agrochemical spray particulates, but despite this there is still a need for improved wind tunnels and methods of analyzing spray particulates.

The critical aspect of differentiation between wind tunnel design as it is generally applied to the measurement of spray particulates relates to solving the primary problem of free test body measurement within a moving mass of air and how this can be made more accurate and precise across a broad range of measuring conditions. The secondary problem is linkage of a single measured endpoint, e.g. the measurement of particle size distribution to determine spray quality, to the actual potential of spray quality to generate off target droplet drift (or spray drift).

Existing open or closed circuit wind tunnels use a horizontal air flow such that the force applied to the test body (spray particulates) within the region of measurement or test section by the mass of air traveling through the wind tunnel is perpendicular to the acceleration of gravity. This is the case because the actual test body, the water droplet and not the spray tip or boom creating it, is not held in a fixed or limited motion position to be analyzed, but is released from the spray tip after spray sheet breakup to move freely through the test section. Wind tunnels with horizontal air flow have a constant bias in the same region towards a kinetic energy driven free moving test body separation that is directly related to the vectoring of test bodies in a direction perpendicular to the necessary path of travel, which places a specific burden on the design to operate at the high end of its velocity spectrum in order to minimize the effect of this acceleration on the measurement.

Existing wind tunnels also have a spray chamber or testing region that essentially has the same dimensions or cross section as the air flow duct, which limits the range of experiments or measurements that can be performed.

There is a need for a wind tunnel which can provide for greater flexibility of testing and/or allow for the separation and movement of the test body to be freely affected by all forces applied concurrently to the body, i.e. to make the test body and the ability to accurately measure it subject not only to the airflow conditions established by the longstanding and well known science of wind tunnel design but by the ever present acceleration of gravity affecting movement of the test body through the region of measurement.

SUMMARY OF THE INVENTION

We have surprisingly discovered a wind tunnel and/or method of analyzing spray particulates, which overcomes or significantly reduces at least one of the problems mentioned herein.

Accordingly, the present invention provides a method of analyzing spray particulates in a wind tunnel comprising an airflow system and a spray chamber comprising a transparent sidewall, wherein the airflow system is capable of delivering air vertically down through the spray chamber, said method comprising spraying the spray particulates from the spray tip; and analyzing the spray particulates through the transparent sidewall.

The invention further provides a method of analyzing spray particulates in a wind tunnel comprising an airflow system and a spray chamber comprising a transparent sidewall for analyzing the spray particulates, said method comprising, (i) using the airflow system to deliver air vertically down through the spray chamber, spraying the spray particulates vertically down from the spray tip, and analyzing the spray particulates by a spatial method; and/or (ii) spraying the spray particulates vertically down from the spray tip in the absence of air flow, and analyzing the spray particulates by a temporal method.

The invention also provides a method of analyzing spray particulates in a wind tunnel comprising an airflow system and a spray chamber, wherein the airflow system is capable of delivering air vertically down and/or horizontally through the spray chamber, said method comprising, (i) using the airflow system to deliver air vertically down through the spray chamber, spraying the spray particulates vertically down from the spray tip, and analyzing the spray particulates, preferably by a spatial method; and/or (ii) spraying the spray particulates vertically down from the spray tip in the absence of air flow, and analyzing the spray particulates, preferably by a temporal method, and/or (iii) using the airflow system to deliver air horizontally through the spray chamber, spraying the spray particulates vertically down from the spray tip, and analyzing the spray particulates.

The invention yet further provides a method of measuring the drift reduction potential of a material by analyzing spray particulates of a composition comprising the material in a wind tunnel comprising an airflow system and a spray chamber, wherein the airflow system is capable of delivering air vertically down and/or horizontally through the spray chamber, said method comprising, (i) using the airflow system to deliver air vertically down through the spray chamber, spraying the spray particulates vertically down from the spray tip, and analyzing the spray particulates; and/or (ii) spraying the spray particulates vertically down from the spray tip in the absence of air flow, and analyzing the spray particulates; and/or (iii) using the airflow system to deliver air horizontally through the spray chamber, spraying the spray particulates vertically down from the spray tip, and analyzing the spray particulates.

The invention still further provides a method of analyzing spray particulates in a wind tunnel comprising an airflow system and a spray chamber comprising a transparent sidewall, said method comprising spraying the spray particulates from the spray tip; and analyzing the spray particulates using a laser through the transparent sidewall by a spatial and temporal method.

The invention even further provides a method of analyzing spray particulates of a composition comprising an alkoxylated sorbitan fatty acid ester, a pesticide and optionally canola oil, in a wind tunnel comprising an airflow system and a spray chamber comprising a transparent sidewall, said method comprising spraying the spray particulates from the spray tip in the presence of air flow; and analyzing the spray particulates using a laser through the transparent sidewall.

The invention also further provides a wind tunnel comprising an airflow system and a spray chamber, wherein the airflow system is capable of delivering air vertically down through the spray chamber, and the spray chamber comprises at least one transparent sidewall and an arm adapted to receive a spray tip which is capable of spraying particulates vertically down into the spray chamber.

The invention also even further provides a wind tunnel comprising an airflow system and a spray chamber defining a tunnel for receiving continuous airflow therein, said airflow system configured to deliver airflow through the tunnel and vertically down through the spray chamber, said spray chamber comprising an arm adapted to receive a spray tip configured to spray particulates vertically down into the spray chamber; wherein the airflow exiting the spray chamber returns to the airflow system through the enclosed interior of the tunnel thereby re-circulating the airflow.

The wind tunnel described herein may be an open circuit or closed circuit, preferably a closed circuit, wind tunnel. The wind tunnel is preferably a low speed (i.e. less than 50 mph, preferably less than 30 mph) wind tunnel and may be used for the accurate analysis of spray particles and spray drift, for product development (such as spray tip development); formulation development (such as active ingredients, e.g. pesticides, particularly herbicides, and adjuvants, e.g. drift reducing materials); product label development; and spray drift reduction technology development (e.g. spray tips, active ingredients and adjuvants). The wind tunnel may be particularly used to measure the effect of spray drift reducing materials in agrochemical compositions in order to evaluate potential off-target movement or spray drift in the field.

Figure 1:
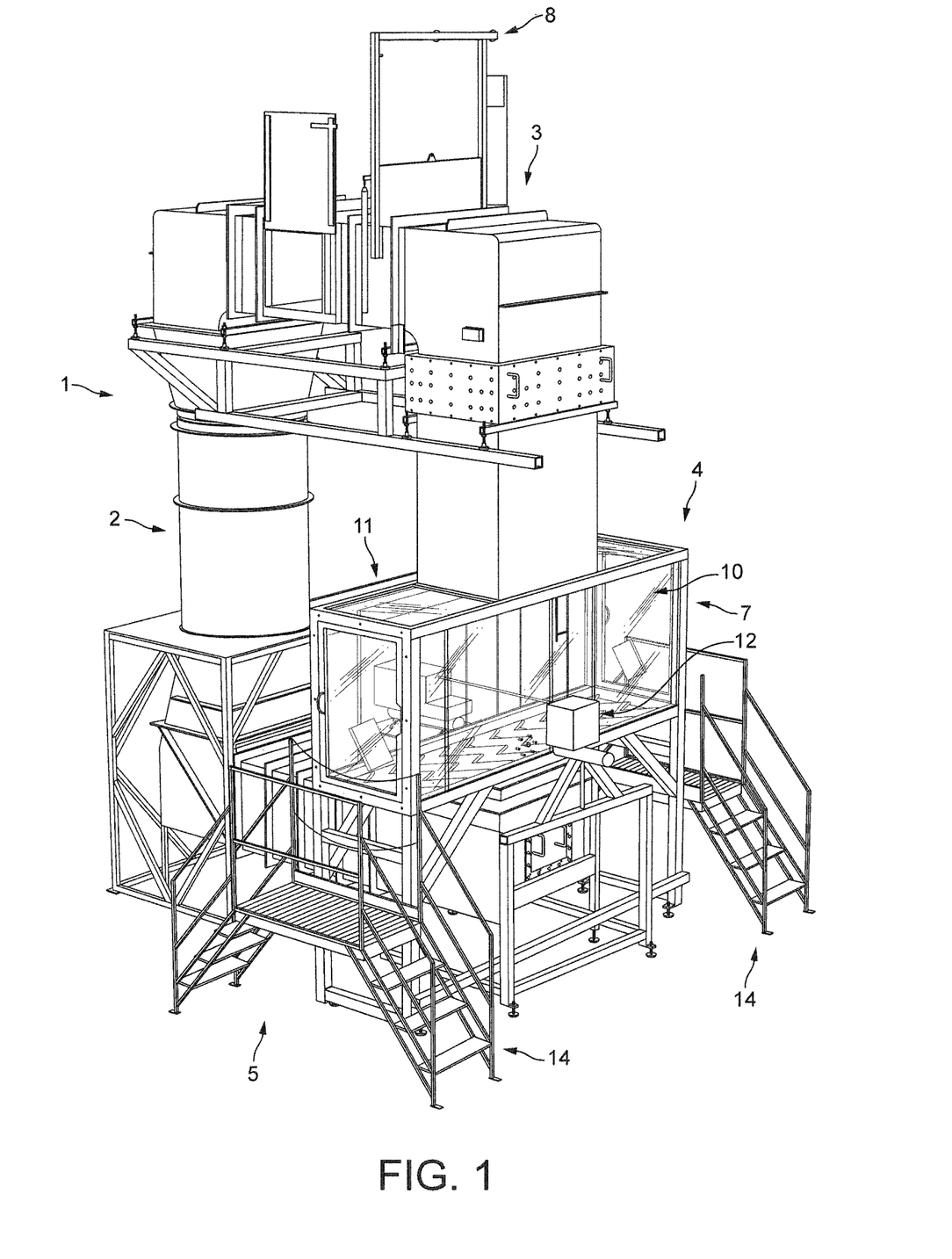
FIG. 1 shows a perspective view of one embodiment of a wind tunnel.

FIG. 1 shows a perspective view of one embodiment of a closed circuit wind tunnel (1). The wind tunnel (1) may include a series of interconnected sections which include sidewalls to form a generally rectangular shape. Some of the sections may be configured as corners and include two open sides arranged at a right angle. For example, as shown in FIG. 1, the wind tunnel (1) may include a fan or blower (2), a first section (3), a second section (4), and a third section (5). The fan (2) and the three sections (3), (4) and (5) may form a generally rectangular structure for the enclosed duct (6) through which the air can flow. The duct may be cyclical such that a volume of air can move from the fan (2), through the second (3), third (4) and fourth (5) sections and be recirculated back into the fan (2) without any air exiting the wind tunnel (1).

The fan (2) of the wind tunnel (1) may include a motor configured to drive the fan at the required wind speed through the testing region or spray chamber (7). In normal operation, the wind speed in the spray chamber is effectively the same as the wind speed in the other sections (3, 4 and 5) of the wind tunnel, but potentially can be varied by the use of expanded or contracted portions of the air duct (6).

The first section (3) of the wind tunnel (1) may include a purge (8) for release of air, which may be connected to the roof of the building containing the wind tunnel (1), e.g. on completion of an experiment or a series of experiments. The third section (5) of the wind tunnel (1) may include a mist collector (9) for trapping the spray droplets and preventing them being carried to the fan (2) with the circulating air.

The second section (4) of the wind tunnel (1) may include a spray chamber (7) which may be configured as a generally rectangular cabinet having a front transparent side wall (10) and a rear transparent side wall (11). A laser (12) and suitable detector (13) may be positioned externally to the front and rear transparent side walls, respectively. The wind tunnel may include a work platform (14) positioned adjacent to the spray chamber (1) on which an operator (15) may stand to operate the laser (12).

Figure 2:
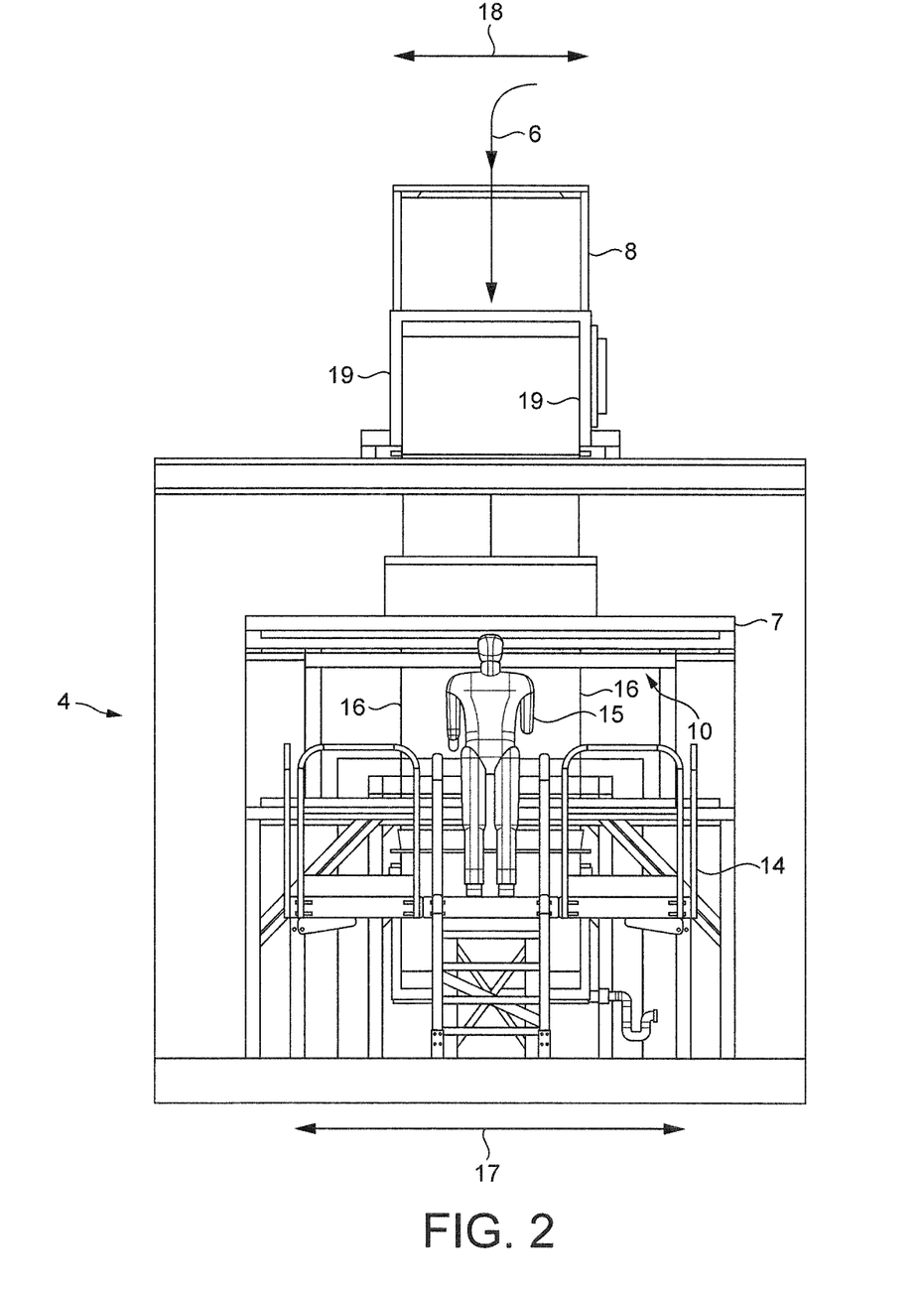
FIG. 2 shows a front view of the spray chamber.

FIG. 2 shows a front view of the spray chamber (7) which forms part of the second section (4) of the wind tunnel (1). FIG. 2 additionally shows an operator (15), and partial side walls (16) present inside the spray chamber (7). The spray chamber (7) may be configured so that the width (17) of the spray chamber is greater than any other dimension (height or depth) thereof, and also greater than the width (18) of the airflow duct. The partial side walls (16) may be configured so that they are substantially in line with the side walls (19) of the airflow duct connected, both above and below, to the spray chamber (7). The intention may be to form an effectively seamless channel through the air duct (6) and the partial side-walls (16) of the spray chamber (7) so that the airflow is not disrupted. The partial side walls (16) may also be configured so that they are removable, and are removed when the spray chamber (7) is configured for horizontal airflow.

Figure 3:
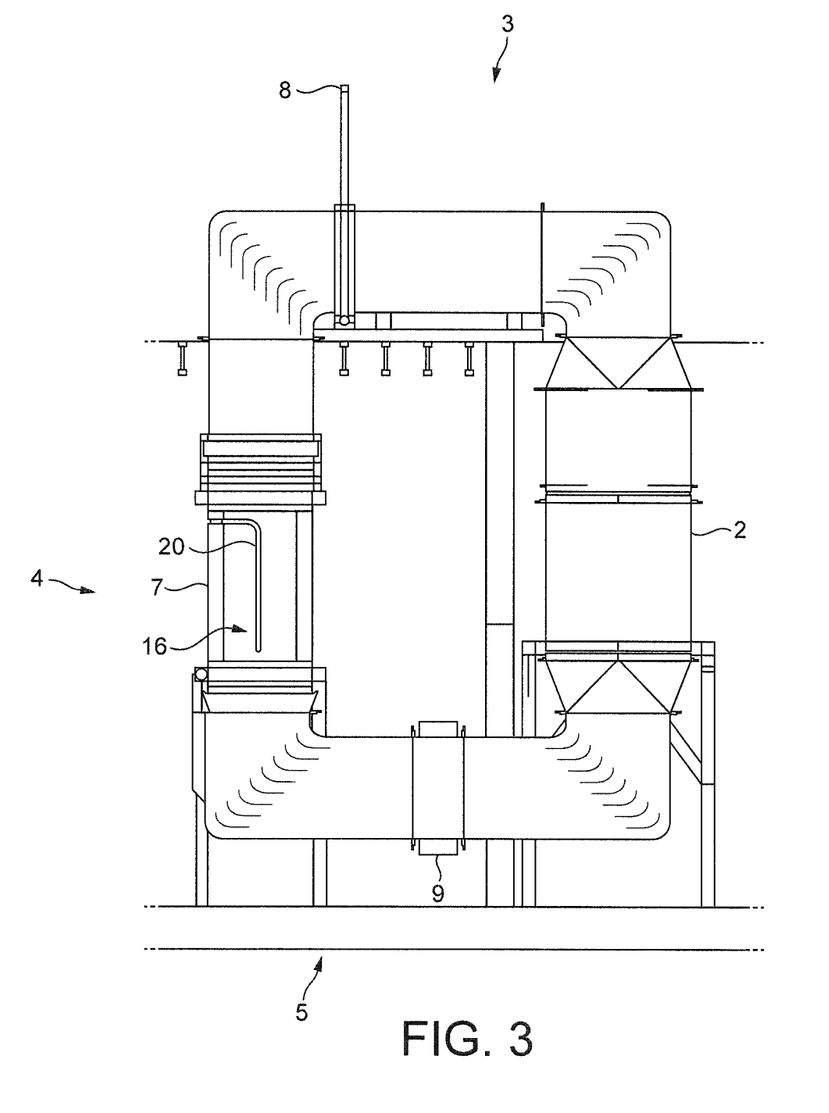
FIG. 3 shows a side view of the wind tunnel.

FIG. 3 shows a side view of the wind tunnel (1). FIG. 3 additionally shows the mist collector (9) in the third section (5) of the wind tunnel (1), and a gap (20) in a partial side wall (16) of the spray chamber (7).

Figure 4:
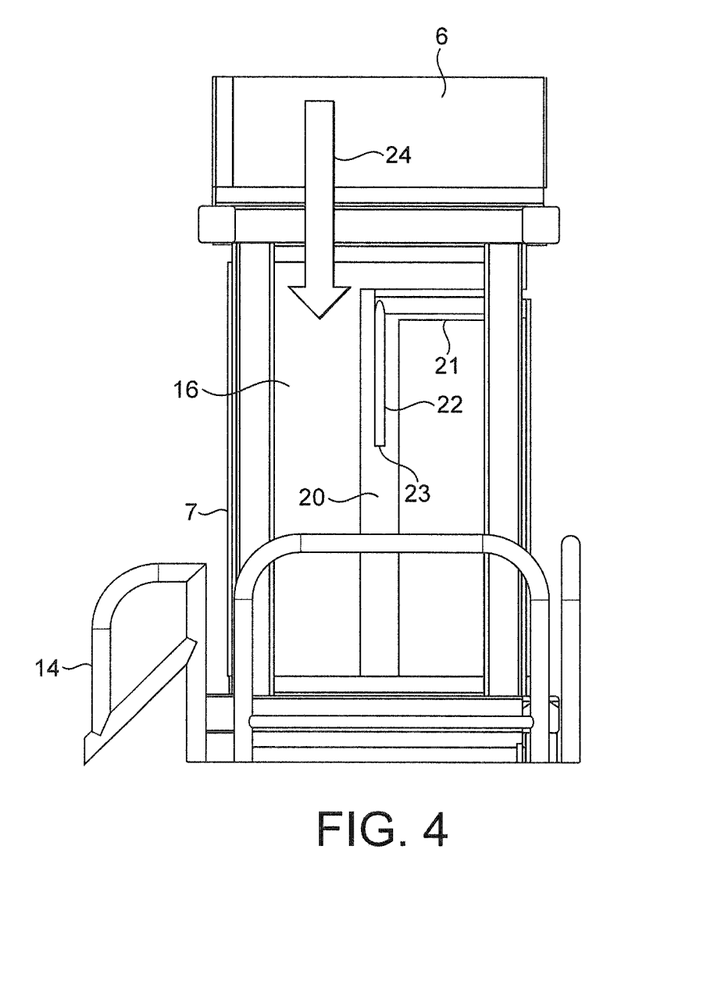
FIG. 4 shows a side view of the spray chamber.

FIG. 4 shows a side view of the spray chamber (7). FIG. 4 additionally shows a lateral extending spray arm (21) connected to a vertical extending spray arm (22) configured to contain a spray nozzle or tip (23), inside the spray chamber (7). The spray arms (21, 22) containing the spray nozzle (23) are configured to be capable of passing through the gap (20) in the partial side wall (16). The shape of the spray arms (21, 22) may be configured so as to minimize the disruption of the airflow through the spray chamber. The spray nozzle (23) may be configured to spray vertically down into the spray chamber (7). The arrow (24) shows the direction of vertical airflow down through the spray chamber (7).

Figure 5:
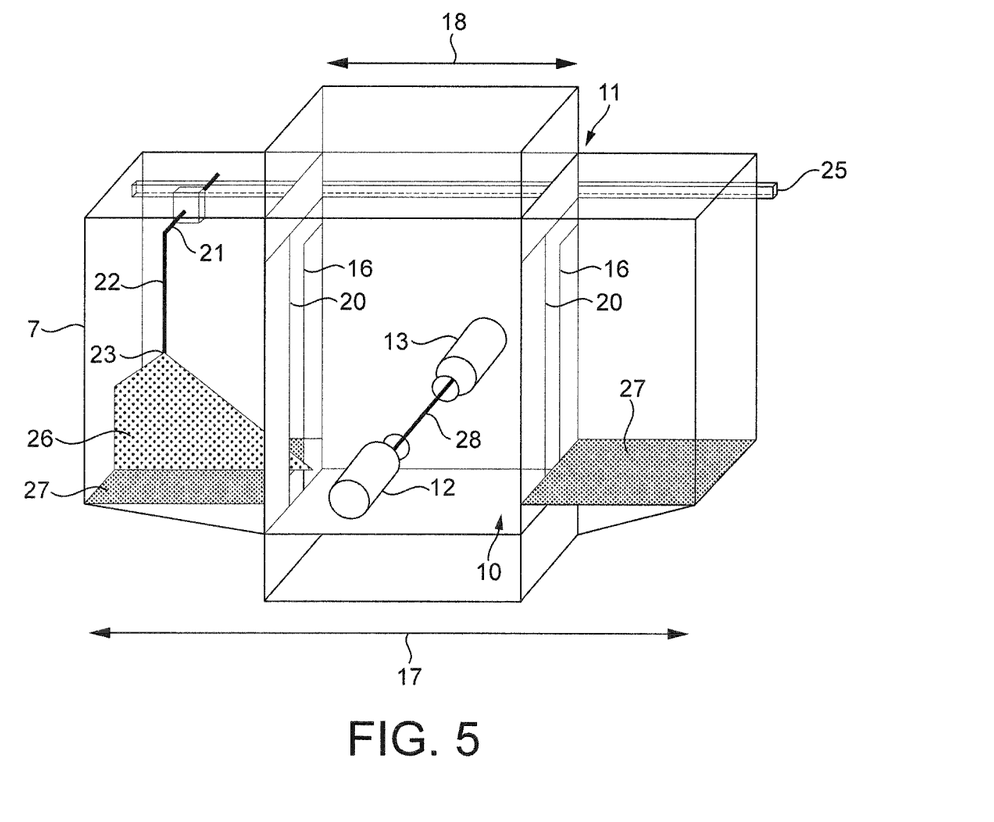
FIG. 5 shows a schematic view of the spray chamber.

FIG. 5 shows a schematic view of the spray chamber. FIG. 5 additionally shows a track (25) positioned near the roof of the spray chamber (7) which may be configured to be connected to the lateral extending spray arm (21) such that the spray arm (21, 22) and spray nozzle (23) can travel along the track (25), horizontally traversing the spay chamber (7), and passing through the gap (20) in the side walls (16). A suitable motor may be used to move the spray arm (21, 22) and spray nozzle (23) along the track (25) at a required speed.

FIG. 5 also shows the spray plume (26) which can fall vertically down onto the floor (27) of the spray chamber (7), and the laser light (28) which is produced by the laser (12) and measured by the detector (13) positioned on the outside of the front (10) and rear (11), respectively, transparent walls.

Figure 6:
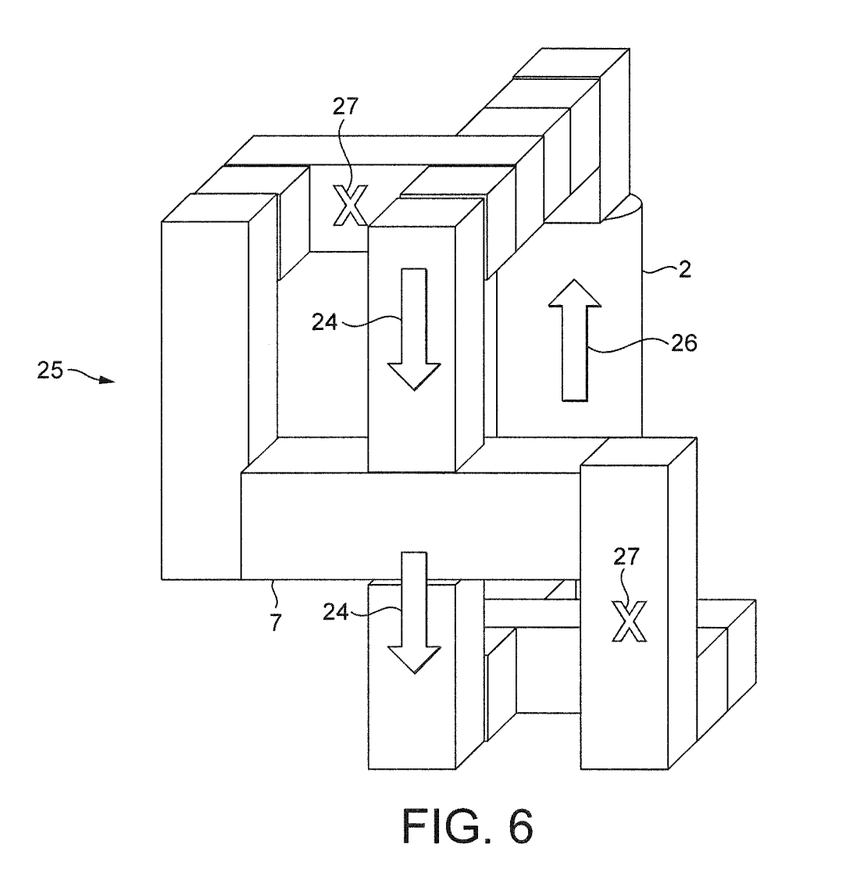
FIG. 6 shows a schematic view of an alternative embodiment of a wind tunnel configured for vertical airflow.

FIG. 6 shows a schematic view of an alternative embodiment of a wind tunnel configured for vertical airflow. The embodiment of this wind tunnel (25) is capable of delivering airflow both vertically down through the spray chamber (7) or horizontally across the spray chamber (7). In FIG. 6 the wind tunnel (25) is configured for vertical airflow and the airflow may be essentially the same as in wind tunnel (7) shown in FIGS. 1 to 5. The arrows (24) show the direction of the vertical airflow down through the spray chamber (7) and the arrow (26) shows the direction of the airflow through the fan (2). The crosses (27) show where the airflow may be blocked to prevent any horizontal airflow across the spray chamber (7).

Figure 7:
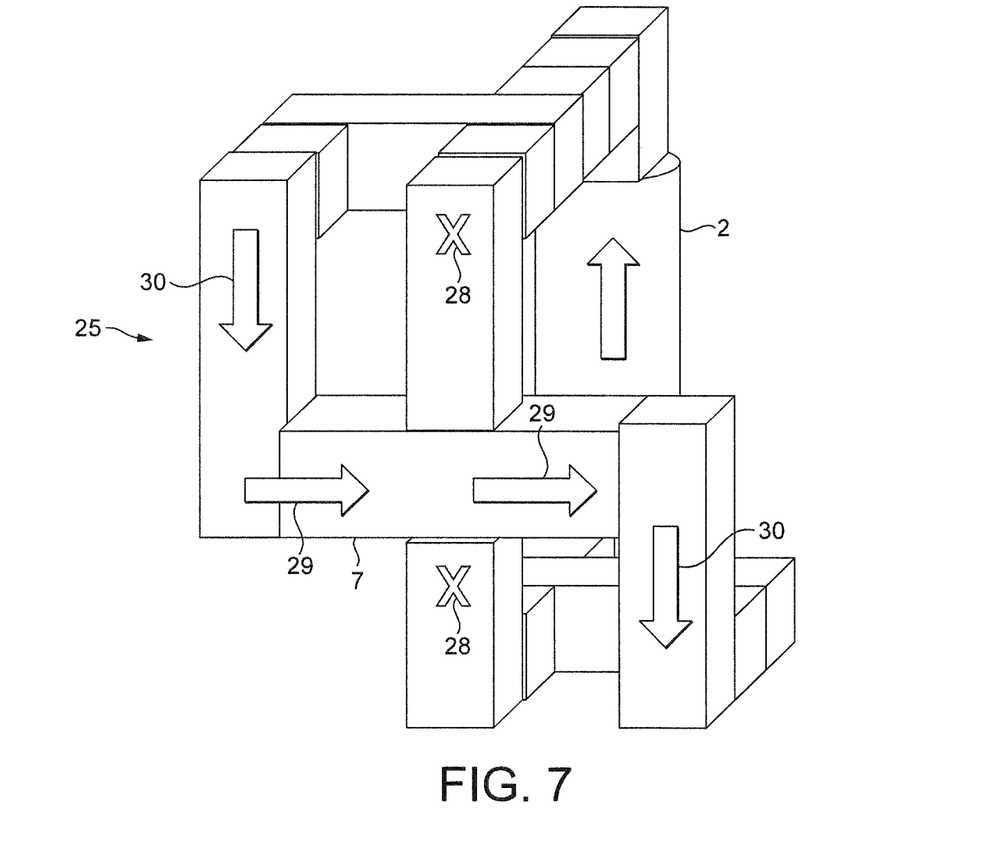
FIG. 7 shows a schematic view of the wind tunnel in FIG. 6 configured for horizontal airflow.

FIG. 7 shows a schematic view of the wind tunnel (25) in FIG. 6 which is configured for horizontal airflow. The crosses (28) show where the airflow may be blocked to prevent any vertical airflow down through the spray chamber (7). The arrows (29) show the direction of the horizontal airflow across the spray chamber (7). The arrows (30) show the direction of the airflow before and after entering the spray chamber (7), such that the airflow is capable of being fully recirculated in the wind tunnel (25). In this configuration, the removable partial side walls (16) are removed so that there is no obstruction to the horizontal airflow (29).

As used herein, the term 'spray drift' refers to off-target movement of droplets of a composition, preferably an agrochemical composition, that may be applied to a target pest or environment for the pest and/or to provide nutrients. Spray applied compositions typically exhibit decreasing tendency to drift with decreasing relative amount, typically expressed as a volume percentage of total spray applied droplet volume, of small size spray droplets, that is, spray droplets having a droplet size below a given value, typically a droplet size of less than 150 μm. Spray drift of pesticides in particular can have undesirable consequences such as, for example, unintended contact of phytotoxic pesticides with non-pest plants, like crops or ornamental plants along with damage to such non-pest plants.

As used herein, the term 'spray drift reducing material' refers to one or more compounds which when added to a sprayable, preferably agrochemical, composition provide a reduction in observed spray drift when compared to the composition not comprising said material.

The wind tunnel described herein has a number of significant advantages over existing wind tunnels which enables a wider range and more accurate spray particle measurements to be made in a single test environment. The spray chamber of the wind tunnel may be connected to an open circuit or a closed circuit airflow system.

The airflow system of the wind tunnel is capable of delivering, and suitably does deliver, air vertically down through the spray chamber, preferably at a speed of less than 50 mph, more preferably in the range from 0 to 40 mph, particularly 5 to 35 mph, and especially 10 to 30 mph. The airflow system is capable of, and preferably does, deliver air vertically down through the spray chamber in the same direction as the force of gravity, and more preferably parallel to or in substantially the same direction as the flow of the spray particulates.

In one embodiment, the spray chamber or testing region of the wind tunnel comprises an arm comprising a spray tip which can be configured to spray particulates vertically down from the spray tip into an area with at least one transparent sidewall, such that the spray particulates can be analyzed, preferably by use of a laser, through a transparent sidewall.

In one preferred embodiment, the cross-sectional area of the spray chamber is greater than the cross-sectional area of the airflow system, by which is meant the air duct that provides air connected vertically to the spray chamber. Thus, preferably at least one dimension of the spray chamber, more preferably the width, is greater than that of the airflow system, i.e. of the vertical airflow duct. The width of the spray chamber is suitably at least 2, preferably at least 2.5, more preferably at least 3, particularly at least 3.5, and especially at least 4, times greater than the width of the airflow system or vertical airflow duct.

The spray tip is preferably attached to a suitable arm or boom which is capable of traversing, more preferably horizontally across, the spray chamber. Measurements may be made with the arm and spray tip in a fixed position, normally in the central area of the spray chamber. Alternatively, measurements may be made with the arm and spray tip in motion as they traverse the spray chamber which enables measurements to be made at various points across the spray, and in particular for substantially the entire width or plume of the spray to be measured. The arm containing the spray tip is preferably moved horizontally across the spray chamber at a rate of greater than 0 and up to 75 cm/sec, more preferably greater than 0 and up to 50 cm/sec, and particularly greater than 0 and up to 25 cm/sec.

In one embodiment, the spray chamber comprises at least two, and preferably two, partial sidewalls which contain a narrow gap configured for the spray arm and tip to pass through as they traverse the spray chamber. The partial sidewalls are preferably in-line with the walls (left and right) of the vertical air ducts (above, and more preferably also below the spray chamber) of the airflow system so that a seamless channel is formed through the air duct(s) and the partial side-walls of the spray chamber. The partial sidewalls are preferably removable, and are removed when the spray chamber is configured for horizontal air flow.

The wind tunnel described herein enables both spatial and temporal measurements, as known in the art, to be made in a single test environment, resulting in potentially more realistic and accurate modelling of spray drift. Both measurements are preferably made by using a laser positioned on the outside of a transparent side wall of the spray chamber. The laser and suitable detector are preferably lined up on the outside of opposite transparent side walls, and more preferably in a fixed position whilst the measurements are being taken. The spatial measurements are preferably made using a diffraction technique, and the temporal measurements preferably made using an image analysis or phase doppler technique, as known in the art.

In one embodiment, the method of analyzing spray particulates in the wind tunnel comprises, (i) the airflow system delivering air vertically down through the spray chamber, preferably at a speed of less than 50 mph, more preferably 0 to 40 mph, particularly 5 to 35 mph, and especially 10 to 30 mph, (ii) spraying the spray particulates from the spray tip, preferably vertically down into the spray chamber, more preferably whilst the spray tip is in motion by traversing the spray chamber, and (iii) using a laser to take spatial measurements of the spray particulates, preferably by a diffraction technique, more preferably across the width, particularly across substantially the entire width, of the spray. The spatial measurements in (iii) preferably comprise, consist essentially of, or consist of spray particle size and/or particle distribution measurements.

In another embodiment, the method of analyzing spray particulates in the wind tunnel comprises, (i) spraying the spray particulates from the spray tip in the absence of air flow, preferably vertically down into the spray chamber, more preferably whilst the spray tip is in a fixed position in the spray chamber, and (ii) using a laser to take temporal measurements of the spray particulates, preferably by an image analysis or phase doppler technique. The temporal measurements in (ii) preferably comprise, consist essentially of, or consist of, (a) spray particle size and/or particle size distribution measurements, and/or (b) spray particle velocity and/or particle velocity distribution measurements.

In another embodiment, the airflow system of the wind tunnel is capable of delivering air horizontally across the spray chamber. In this embodiment, the airflow can be configured to enter one side of the spray chamber and travel horizontally across and out of the opposing side of the spray chamber. In this embodiment, the airflow system is capable of delivering air horizontally across the spray chamber, preferably at a speed of less than 20 mph, more preferably in the range from 0 to 15 mph, particularly 2 to 12 mph, and especially 3 to 10 mph. The horizontal airflow is perpendicular to the force of gravity, and preferably also substantially perpendicular to the preferred vertical flow of the spray particulates.

In one embodiment, the method of analyzing spray particulates in the wind tunnel comprises, (i) the airflow system delivering air horizontally across the spray chamber, preferably at a speed of less than 20 mph, more preferably 0 to 15 mph, particularly 2 to 12 mph, and especially 3 to 10 mph, (ii) spraying the spray particulates from the spray tip, preferably vertically down, into the spray chamber, more preferably whilst the spray tip is in a fixed position in the spray chamber, and (iii) measuring downrange spray drift, and optionally using a laser to take spatial measurements of the spray particulates, preferably by a diffraction technique.

The downrange spray drift measurements in (iii) above effectively measure, the volume or mass (flux) of spray falling on different areas of the spray chamber and thus are a direct measurement of spray drift. The values can be defined in terms of mass of spray per unit area at set distances downwind of the spray nozzle. The mass of spray can be determined, for example, by the use of a fluorescent indicator and/or collection pots, monofilaments, water sensitive paper, and/or filter/absorption pads placed at a range of fixed distances from the spray nozzle in the spray chamber, either on the floor and/or placed at different heights above the floor or below the nozzle.

In a further modification, the direct biological effect of an agrochemical spray can be determined in (iii) above by instead of measuring the volume of spray, having actual plant specimens on the floor of the spray chamber at different distances from the spray nozzle. After spraying the plants can be removed and placed in growing conditions to determine the effect of the active, e.g. herbicide, present in the agrochemical spray. In this way, spray particle size and/or spray particle velocity and/or spray drift measurements can be directly correlated with biological effect, wherein all the tests have been made in a single test environment.

In another embodiment, the direct biological effect of an agrochemical spray can be determined by, (i) the airflow system of the wind tunnel delivering air vertically down through the spray chamber, preferably at a speed of less than 15 mph, more preferably 0 to 10 mph, particularly 0 to 5 mph, and especially 0 to 3 mph, (ii) spraying the spray particulates from the spray tip, preferably vertically down, into the spray chamber, more preferably whilst the spray tip is in motion by traversing the spray chamber, (iii) having plant specimens on the floor of the spray chamber, and (iv) subjecting the plants to growing conditions after spraying.

The wind tunnel described herein provides the ability to switch from a spatial particle size measurement technique (such as laser diffraction) to a temporal particle size measurement technique (such as laser image and/or phase doppler analysis) in the same configuration (or in a single test environment) and consequently provides the capacity to generate much more detailed data on spray properties under the same conditions. The critical measurable components of determining off target agrochemical spray movement can all be measured together in the same system which removes the problems associated with building models based on connecting data developed under very different conditions. This enables the construction of more accurate quantitative models to describe drift based on accurate droplet size data, particularly when generated at low air speeds.

The agrochemical composition which is spray tested herein may be a simple model system containing the presence or absence of a potential spray drift reducing material, or a complex system containing most or all the ingredients normally present in an agrochemical composition sprayed onto crops by the farmer. The agrochemical composition is suitable for spraying and normally contains an active or nutrient agrochemical. Agrochemically active compounds, in particular systemic herbicides, insecticides and fungicides, or nutrients require a formulation which allows the active compounds or nutrients to be taken up by the plant/target organisms.

A spray drift reducing material may be combined with other components in order to form a sprayable agrochemical composition comprising at least one agrochemical active and/or nutrient. The agrochemical active compounds may be formulated as an emulsifiable concentrate (EC), emulsion concentrate (EW), suspension concentrate (SC), soluble liquid (SL), as an oil-based suspension concentrate (OD), and/or suspoemulsions (SE). Agrochemical concentrates are agrochemical compositions, which may be aqueous or non-aqueous, and which are designed to be diluted with water (or a water based liquid) to form the corresponding spray composition. Such agrochemical concentrates include those in liquid form (such as solutions, emulsions, or dispersions) and in solid form (especially in water dispersible solid form) such as granules or powders. In an EC formulation and in an SL formulation, the active compound may preferably be present in dissolved form, whereas in an OD, SC, or SE formulations the active compound may preferably be present as a solid or emulsified liquid. Spray drift reducing materials may find particular use in a SC, OD, or SE formulation, which may be diluted to form a sprayable agrochemical composition.

Sprayable agrochemical compositions are aqueous agrochemical formulations including all the components which are desired to apply to the plants or their environment. Spray compositions can be made up by simple dilution of concentrates containing desired components (other than water), or by mixing of the individual components, or a combination of diluting a concentrate and adding further individual components or mixtures of components. Typically such end use mixing is carried out in the tank from which the composition is sprayed, or alternatively in a holding tank for filling the spray tank. Such mixing and mixtures are typically termed tank mixing and tank mixtures. A spray drift reducing material may be incorporated into the composition of the agrochemical active or nutrient compound (in-can formulation) or be added after dilution of the concentrated composition of the spray liquor (tank-mix). To avoid dosage errors and to improve user safety during application of agrochemical products, it is advantageous to incorporate the spray drift reducing material into the concentrated composition. Said concentrates may be diluted for use resulting in a dilute composition having an agrochemical active or nutrient concentration of about 0.5 wt. % to about 5 wt. %. In said dilute composition (for example, a spray composition, where a spray application rate may be from 10 to 500 l·ha$^{-1}$) the agrochemical active concentration may be in the range from about 0.001 wt. % to about 1 wt. % and/or the nutrient concentration may be in the range from about 0.1 wt. % to about 5 wt. %, of the total composition as sprayed.

The spray drift reducing material will typically be used either in an amount proportional to the amount of the active agrochemical or nutrient in the composition, or more preferably in an amount proportional to the volume of spray solution to be applied. In diluted form, for example, a spray composition, the spray drift reducing material will typically be present at a concentration of from 0.001 wt. % to 2.0 wt. %, more usually from 0.01 wt. % to 1.0 wt. % of the spray composition. Further preferably, from 0.01 wt. % to 0.5 wt. %, and particularly from 0.1 wt. % to 0.4 wt. % of the spray composition. The agrochemical spray compositions will typically have a pH within the range from moderately acidic (e.g. about 3) to moderately alkaline (e.g. about 10), and particular near neutral (e.g. about 5 to 8).

The agrochemical spray composition may also include solvents (other than water) such as monopropylene glycol, oils which can be vegetable or mineral oils such as spray oils (oils included in spray formulations as non-surfactant adjuvants), associated with the spray drift reducing material. Such solvents may be included as a solvent for any spray drift reducing material and/or as a humectant, e.g. especially propylene glycol. When used such solvents will typically be included in an amount of from 5 wt. % to 500 wt. %, desirably 10 wt. % to 100 wt. %, by weight of the spray drift reducing material. Such combinations can also include salts such as ammonium chloride and/or sodium benzoate, and/or urea especially as gel inhibition aids.

The agrochemical spray composition which is spray tested herein may also include; preservatives and/or antimicrobials such as organic acids, or their esters or salts such as ascorbic e.g. ascorbyl palmitate, sorbic e.g. potassium sorbate, benzoic e.g. benzoic acid and methyl and propyl 4-hydroxybenzoate, propionic e.g. sodium propionate, phenol e.g. sodium 2-phenylphenate; 1,2-benzisothiazolin-3-one; or formaldehyde as such or as paraformaldehyde; or inorganic materials such as sulphurous acid and its salts, typically in amounts of 0.01 wt. % to 1 wt. % of the composition; and/or antifoam agents e.g. polysiloxane antifoam agents, typically in amounts of 0.005 wt. % to 1 wt. % of the composition.

The agrochemical spray composition may also include other components such as: binders, particularly binders which are readily water soluble to give low viscosity solutions at high binder concentrations, such as polyvinylpyrrolidone; polyvinyl alcohol; carboxymethyl cellulose; gum arabic; sugars e.g. sucrose or sorbitol; starch; ethylene-vinyl acetate copolymers, sucrose and alginates, diluents, absorbents or carriers such as carbon black; talc; diatomaceous earth; kaolin; aluminium, calcium or magnesium stearate; sodium tripolyphosphate; sodium tetraborate; sodium sulphate; sodium, aluminium and mixed sodium-aluminium silicates; and sodium benzoate, disintegration agents, such as surfactants, materials that swell in water, for example carboxy methylcellulose, collodion, polyvinylpyrrolidone and microcrystalline cellulose swelling agents; salts such as sodium or potassium acetate, sodium carbonate, bicarbonate or sesquicarbonate, ammonium sulphate and dipotassium hydrogen phosphate;

wetting agents such as alcohol ethoxylate and alcohol ethoxylate/propoxylate wetting agents;

dispersants such as sulphonated naphthalene formaldehyde condensates and acrylic copolymers such as the comb copolymer having capped polyethylene glycol side chains on a polyacrylic backbone;

emulsifiers such as alcohol ethoxylates, ABA block co polymers, or castor oil ethoxylates;

antifoam agents; and viscosity modifiers such as commercially available water soluble or miscible gums, e.g. xanthan gums, and/or cellulosics, e.g. carboxy-methyl, ethyl or propylcellulose. Suitable agrochemical actives for use in the agrochemical spray composition tested herein are all agrochemically active compounds, preferably those which are solid at room temperature. Agrochemical actives refer to biocides which are plant protection agents, more particular chemical substances capable of killing different forms of living organisms used in fields such as medicine, agriculture, forestry, and mosquito control. Also counted under the group of biocides are so-called plant growth regulators. Biocides for use in the agrochemical spray formulation are typically divided into two sub-groups: (i) pesticides, including fungicides, herbicides, insecticides, algicides, moluscicides, miticides and rodenticides, and (ii) antimicrobials, including germicides, antibiotics, antibacterials, antivirals, antifungals, antiprotozoals and antiparasites. In particular, biocides selected from insecticides, fungicides, or herbicides may be particularly preferred.

The term 'pesticide' refers to any substance or mixture of substances intended for preventing, destroying, repelling, or mitigating any pest. A pesticide may be a chemical substance or biological agent (such as a virus or bacteria) used against pests including insects, plant pathogens, weeds, mollusks, birds, mammals, fish, nematodes (roundworms) and microbes that compete with humans for food, destroy property, spread disease or are a nuisance. In the following examples, pesticides suitable for the agrochemical spray composition tested herein are given.

A fungicide is a chemical that controls the growth of fungi. Fungicides are chemical compounds that can to prevent the spread of fungi in gardens and crops. Fungicides can also be used to fight fungal infections. Fungicides can either be contact or systemic. A contact fungicide kills fungi when sprayed on its surface. A systemic fungicide has to be absorbed by the fungus before the fungus dies.

Examples for suitable fungicides, include the following species: (3-ethoxypropyl)mercury bromide, 2-methoxyethylmercury chloride, 2-phenylphenol, 8-hydroxyquinoline sulphate, 8-phenylmercuri oxyquinoline, acibenzolar, acylamino acid fungicides, acypetacs, aldimorph, aliphatic nitrogen fungicides, allyl alcohol, amide fungicides, ampropylfos, anilazine, anilide fungicides, antibiotic fungicides, aromatic fungicides, aureofungin, azaconazole, azithiram, azoxystrobin, barium polysulphide, benalaxyl-M, benodanil, benomyl, benquinox, bentaluron, benthiavalicarb, benzalkonium chloride, benzamacril, benzamide fungicides, benzamorf, benzanilide fungicides, benzimidazole fungicides, benzimidazole precursor fungicides, benzimidazolylcarbamate fungicides, benzohydroxamic acid, benzothiazole fungicides, bethoxazin, binapacryl, biphenyl, bitertanol, bithionol, blasticidin-S, Bordeaux mixture, boscalid, bridged diphenyl fungicides, bromuconazole, bupirimate, Burgundy mixture, buthiobate, butylamine, calcium polysulphide, captafol, captan, carbamate fungicides, carbamorph, carbanilate fungicides, carbendazim, carboxin, carpropamid, carvone, Cheshunt mixture, chinomethionat, chlobenthiazone, chloraniformethan, chloranil, chlorfenazole, chlorodinitronaphthalene, chloroneb, chloropicrin, chlorothalonil, chlorquinox, chlozolinate, ciclopirox, climbazole, clotrimazole, conazole fungicides, conazole fungicides (imidazoles), conazole fungicides (triazoles), copper(II) acetate, copper(II) carbonate, basic, copper fungicides, copper hydroxide, copper naphthenate, copper oleate, copper oxychloride, copper(II) sulphate, copper sulphate, basic, copper zinc chromate, cresol, cufraneb, cuprobam, cuprous oxide, cyazofamid, cyclafuramid, cyclic dithiocarbamate fungicides, cycloheximide, cyflufenamid, cymoxanil, cypendazole, cyproconazole, cyprodinil, dazomet, DBCP, debacarb, decafentin, dehydroacetic acid, dicarboximide fungicides, dichlofluanid, dichlone, dichlorophen, dichlorophenyl, dicarboximide fungicides, dichlozoline, diclobutrazol, diclocymet, diclomezine, dicloran, diethofencarb, diethyl pyrocarbonate, difenoconazole, diflumetorim, dimethirimol, dimethomorph, dimoxystrobin, diniconazole, dinitrophenol fungicides, dinobuton, dinocap, dinocton, dinopenton, dinosulphon, dinoterbon, diphenylamine, dipyrithione, disulphiram, ditalimfos, dithianon, dithiocarbamate fungicides, DNOC, dodemorph, dodicin, dodine, donatodine, drazoxolon, edifenphos, epoxiconazole, etaconazole, etem, ethaboxam, ethirimol, ethoxyquin, ethylmercury 2,3-dihydroxypropyl mercaptide, ethylmercury acetate, ethylmercury bromide, ethylmercury chloride, ethylmercury phosphate, etridiazole, famoxadone, fenamidone, fenaminosulph, fenapanil, fenarimol, fenbuconazole, fenfuram, fenhexamid, fenitropan, fenoxanil, fenpiclonil, fenpropidin, fenpropimorph, fentin, ferbam, ferimzone, fluazinam, fludioxonil, flumetover, fluopicolide, fluoroimide, fluotrimazole, fluoxastrobin, fluquinconazole, flusilazole, flusulphamide, flutolanil, flutriafol, folpet, formaldehyde, fosetyl, fuberidazole, furalaxyl, furametpyr, furamide fungicides, furanilide fungicides, furcarbanil, furconazole, furconazole-cis, furfural, furmecyclox, furophanate, glyodin, griseofulvin, guazatine, halacrinate, hexachlorobenzene, hexachlorobutadiene, hexachlorophene, hexaconazole, hexylthiofos, hydrargaphen, hymexazol, imazalil, imibenconazole, imidazole fungicides, iminoctadine, inorganic fungicides, inorganic mercury fungicides, iodomethane, ipconazole, iprobenfos, iprodione, iprovalicarb, isoprothiolane, isovaledione, kasugamycin, kresoxim-methyl, lime sulphur, mancopper, mancozeb, maneb, mebenil, mecarbinzid, mepanipyrim, mepronil, mercuric chloride, mercuric oxide, mercurous chloride, mercury fungicides, metalaxyl, metalaxyl-M, metam, metazoxolon, metconazole, methasulphocarb, methfuroxam, methyl bromide, methyl isothiocyanate, methylmercury benzoate, methylmercury dicyandiamide, methylmercury pentachlorophenoxide, metiram, metominostrobin, metrafenone, metsulphovax, milneb, morpholine fungicides, myclobutanil, myclozolin, N-(ethylmercury)-p-toluenesulphonanilide, nabam, natamycin, nitrostyrene, nitrothal-isopropyl, nuarimol, OCH, octhilinone, ofurace, organomercury fungicides, organophosphorus fungicides, organotin fungicides, orysastrobin, oxadixyl, oxathiin fungicides, oxazole fungicides, oxine copper, oxpoconazole, oxycarboxin, pefurazoate, penconazole, pencycuron, pentachlorophenol, penthiopyrad, phenylmercuriurea, phenylmercury acetate, phenylmercury chloride, phenylmercury derivative of pyrocatechol, phenylmercury nitrate, phenylmercury salicylate, phenylsulphamide fungicides, phosdiphen, phthalide, phthalimide fungicides, picoxystrobin, piperalin, polycarbamate, polymeric dithiocarbamate fungicides, polyoxins, polyoxorim, polysulphide fungicides, potassium azide, potassium polysulphide, potassium thiocyanate, probenazole, prochloraz, procymidone, propamocarb, propiconazole, propineb, proquinazid, prothiocarb, prothioconazole, pyracarbolid, pyraclostrobin, pyrazole fungicides, pyrazophos, pyridine fungicides, pyridinitril, pyrifenox, pyrimethanil, pyrimidine fungicides, pyroquilon, pyroxychlor, pyroxyfiir, pyrrole fungicides, quinacetol, quinazamid, quinconazole, quinoline fungicides, quinone fungicides, quinoxaline fungicides, quinoxyfen, quintozene, rabenzazole, salicylanilide, silthiofam, simeconazole, sodium azide, sodium orthophenylphenoxide, sodium pentachlorophenoxide, sodium polysulphide, spiroxamine, streptomycin, strobilurin fungicides, sulphonanilide fungicides, sulphur, sultropen, TCMTB, tebuconazole, tecloftalam, tecnazene, tecoram, tetraconazole, thiabendazole, thiadifluor, thiazole fungicides, thicyofen, thifluzamide, thiocarbamate fungicides, thiochlorfenphim, thiomersal, thiophanate, thiophanate-methyl, thiophene fungicides, thioquinox, thiram, tiadinil, tioxymid, tivedo, tolclofos-methyl, tolnaftate, tolylfluanid, tolylmercury acetate, triadimefon, triadimenol, triamiphos, triarimol, triazbutil, triazine fungicides, triazole fungicides, triazoxide, tributyltin oxide, trichlamide, tricyclazole, trifloxystrobin, triflumizole, triforine, triticonazole, unclassified fungicides, undecylenic acid, uniconazole, urea fungicides, validamycin, valinamide fungicides, vinclozolin, zarilamid, zinc naphthenate, zineb, ziram, zoxamide, and mixtures thereof.

A herbicide is a pesticide used to kill unwanted plants. Selective herbicides kill specific targets while leaving the desired crop relatively unharmed. Some of these act by interfering with the growth of the weed and are often based on plant hormones. Herbicides used to clear waste ground are non-selective and kill all plant material with which they come into contact. Herbicides are widely used in agriculture and in landscape turf management. They are applied in total vegetation control (TVC) programs for maintenance of highways and railroads. Smaller quantities are used in forestry, pasture systems, and management of areas set aside as wildlife habitat. Suitable herbicides may be selected from the group consisting of aryloxycarboxylic acid e.g. MCPA, aryloxyphenoxypropionates e.g. clodinafop, cyclohexanedione oximes e.g. sethoxydim, hydroxybenzonitriles e.g. bromoxynil, sulphonylureas e.g. nicosulphuron, triazolopyrimidines e.g. penoxsulam, triketiones e.g. mesotriones, triazine herbicides such as metribuzin, hexaxinone, or atrazine; sulphonylurea herbicides such as chlorsulfuron; uracils such as lenacil, bromacil, or terbacil; urea herbicides such as linuron, diuron, siduron, or neburon; acetanilide herbicides such as alachlor, or metolachlor; thiocarbamate herbicides such as benthiocarb, triallate; oxadiazolone herbicides such as oxadiazon; isoxazolidone herbicides, phenoxyacetic acids; diphenyl ether herbicides such as fluazifop, acifluorfen, bifenox, or oxyfluorfen; dinitro aniline herbicides such as trifluralin; organophosphonate herbicides such as glufosinate salts and esters and glyphosate salts and esters; and/or dihalobenzonitrile herbicides such as bromoxynil, or ioxynil, benzoic acid herbicides, dipyridilium herbicides such as paraquat, and mixtures thereof.

Particularly preferred herbicides may be selected from 2,4-dichlorophenoxyacetic acid (2,4-D), dicamba as benzoic acid, glyphosate, glufosinate, imazapic imazethapyr as imidazolinone, metolachlor as chloroacetamide, picloram, clopyralid, and triclopyr as pyridinecarboxylic acids or synthetic auxins, their respective water soluble salts and esters, and mixtures thereof.

An insecticide is a pesticide used against insects in all developmental forms, and include ovicides and larvicides used against the eggs and larvae of insects. Insecticides are used in agriculture, medicine, industry and the household.

Suitable insecticides may include those selected from the group consisting of chlorinated insecticides such as, for example, Camphechlor, DDT, Hexachlorocyclohexane, gamma-Hexachlorocyclohexane, Methoxychlor, Pentachlorophenol, TDE, Aldrin, Chlordane, Chlordecone, Dieldrin, Endosulphan, Endrin, Heptachlor, Mirex and their mixtures; organophosphorous compounds such as, for example, Acephate, Azinphos-methyl, Bensulide, Chlorethoxyfos, Chlorpyrifos, Chlorpyriphos-methyl, Diazinon, Dichlorvos (DDVP), Dicrotophos, Dimethoate, Disulphoton, Ethoprop, Fenamiphos, Fenitrothion, Fenthion, Fosthiazate, Malathion, Methamidophos, Methidathion, Methyl-parathion, Mevinphos, Naled, Omethoate, Oxydemeton-methyl, Parathion, Phorate, Phosalone, Phosmet, Phostebupirim, Pirimiphos-methyl, Profenofos, Terbufos, Tetrachlorvinphos, Tribufos, Trichlorfon and their mixture; carbamates such as, for example, Aldicarb, Carbofuran, Carbaryl, Methomyl, 2-(1-Methylpropyl)phenyl methylcarbamate and their mixtures; pyrethroids such as, for example, Allethrin, Bifenthrin, Deltamethrin, Permethrin, Resmethrin, Sumithrin, Tetramethrin, Tralomethrin, Transfluthrin and their mixtures; plant toxin derived compounds such as, for example, Derris (rotenone), Pyrethrum, Neem (Azadirachtin), Nicotine, Caffeine and their mixture; neonicotinoids such as imidacloprid and acetamiprid; abannectin e.g. emamactin; oxadiazines such as indoxacarb; and/or anthranilic diamides such as rynaxypyr, and mixtures thereof.

Miticides are pesticides that kill mites. Antibiotic miticides, carbamate miticides, formamidine miticides, mite growth regulators, organochlorine, permethrin and organophosphate miticides all belong to this category. Molluscicides are pesticides used to control mollusks, such as moths, slugs and snails. These substances include metaldehyde, methiocarb and aluminium sulphate. A nematicide is a type of chemical pesticide used to kill parasitic nematodes (a phylum of worm).

Particular preference is given to active compounds from the classes of the azole fungicides (azaconazole, bitertanol, bromuconazole, cyproconazole, diclobutrazole, difenoconazole, diniconazole, diniconazole-M, epoxiconazole, etaconazole, fenarimol, fenbuconazole, fluquinconazole, flurprimidol, flusilazole, flutriafol, furconazole, furconazole-cis, hexaconazole, imazalil, imazalil sulphate, imibenconazole, ipconazole, metconazole, myclobutanil, nuarimol, oxpoconazole, paclobutrazole, penconazole, pefurazoate, prochloraz, propiconazole, prothioconazole, pyrifenox, simeconazole, tebuconazole, tetraconazole, triadimefon, triadimenol, triflumizole, triforin, triticonazole, uniconazole, voriconazole, viniconazole), strobilurin fungicides (azoxystrobin, dimoxystrobin, fluoxastrobin, kresoxim-methyl, metominostrobin, orysastrobin, picoxystrobin, pyraclostrobin, trifloxystrobin), the SDH fungicides, the chloronicotinyl insecticides (clothianidin, dinotefuran, imidacloprid, thiamethoxam, nitenpyram, nithiazin, acetamiprid, nitenpyram, thiacloprid), the insecticidal ketoenols (spirodiclofen, spiromesifen, spirotetramate), fiproles (fiprole, ethiprole) and butenolides, and also pymetrozine, fluopicolid, N-(3',4'-dichloro-5-fluoro-1,1'-biphenyl-2-yl)-3-(difluoromethyl)-1-methyl-1H-pyrazole-4-carboxamide and N-{2-[3-chloro-5-(trifluoromethyl)-2-pyridinyl]ethyl}-2-(trifluoromethyl)benzamide. Particular preference is also given to herbicides, in particular glyphosate, glufosinate, paraquat, 2,4-dichlorophenoxyacetic acid, dicamba, imazethapyr, triketones and herbicidal ketoenols, flumetsulam, clopyralid, clethodim, halauxyfen, bicylopyrone, fomesafen, flumioxazin, pyroxasulfone, sulfentrazone, bentazon, and also safeners.

In an alternative embodiment the agrochemical spray composition tested herein may comprise nutrients in addition to, or as an alternative to, pesticide actives. Nutrients refer to chemical elements and compounds which are desired or necessary to promote or improve plant growth. Suitable nutrients generally are described as macronutrients or micronutrients. Micronutrients typically refer to trace metals or trace elements, and are often applied in lower doses. Macronutrients typically refer to those comprising nitrogen, phosphorus, and potassium, and include fertilisers such as ammonium sulphate, and water conditioning agents. Macronutrients are normally present as insoluble solids.

Suitable micronutrients include trace elements selected from zinc, boron, chlorine, copper, iron, molybdenum, and manganese. The micronutrients may be in a soluble form or included as insoluble solids, and may be salts or chelated.

Suitable macro nutrients include fertilisers and other nitrogen, phosphorus, potassium, calcium, magnesium, sulphur containing compounds, and water conditioning agents. Suitable fertilisers include inorganic fertilisers that provide nutrients such as nitrogen, phosphorus, potassium or sulphur. Examples of such fertilisers include: for nitrogen as the nutrient: nitrates and or ammonium salts such as ammonium nitrate, including in combination with urea, e.g. as uran type materials, calcium ammonium nitrate, ammonium sulphate nitrate, ammonium phosphates, particularly mono-ammonium phosphate, di-ammonium phosphate and ammonium polyphosphate, ammonium sulphate, and the less commonly used calcium nitrate, sodium nitrate, potassium nitrate and ammonium chloride; for potassium as the nutrient: potassium chloride, sulphate e.g. as mixed sulphate with magnesium, phosphates, particularly potassium dihydrogen phosphate and potassium polyphosphate and less commonly potassium nitrate; for phosphorus as the nutrient: acidic forms of phosphorus such as phosphoric, pyrophosphoric or polyphosphoric acids, but more usually salt forms such as ammonium phosphates, particularly mono-ammonium phosphate, di-ammonium phosphate, and ammonium polyphosphate, potassium phosphates, particularly potassium dihydrogen phosphate and potassium polyphosphate; for sulphur as the nutrient: ammonium sulphate and potassium sulphate, e.g. the mixed sulphate with magnesium.

Spray drift reducing materials tested herein preferably reduce the amount of undesired small spray droplets (driftable fines) and/or the amount of undesired large droplets in a sprayed agrochemical composition, in a commercially significant and desirable manner. It is understood that the modification of the spray drift characteristics of an agrochemical composition can be achieved through the modification of the size and size distribution of droplets in the spray.

Spray applied compositions typically exhibit decreasing tendency to drift when a decreased amount of small size spray droplets are formed, preferably spray droplets having a droplet size typically below 150 μm. This amount of small driftable droplets may be expressed as a volume percentage of the droplet volume of the total spray applied. There is a desire to reduce the amount of spray drift when compared to compositions containing no spray drift reducing material. Spray drift of pesticides can have undesirable consequences which include unintended contact of phytotoxic pesticides with non-pest plants causing damage to these non-pest plants, such as crops or ornamental plants.

In addition, use of the spray drift reducing material tested herein may result in no or few extremely large droplets being created which might otherwise be expected when spraying an agrochemical composition. Large undesired droplets would typically be those having a droplet size greater than 500 μm. A spray drift reducing material will be understood to improve spray droplet characteristics, preferably with no or little degradation of the spray pattern.

Preferably the spray drift reducing material tested herein decreases the volume of driftable fine droplets (fines). In particular, driftable fine droplets are those which are of size less than 150 μm, where this is understood by ASTM 1519 to represent the droplet size below which the droplets are driftable. The reduction in spray drift will therefore be understood as a reduction in the volume percentage of droplets having a droplet size of less than 150 μm, compared to an analogous agrochemical composition which does not comprise a spray drift reducing material.

A spray drift reducing material preferably provides a percentage reduction of droplets having a size of less than 150 μm, or more preferably of less than 105 μm, of (a) at least 10% at a spray pressure of 30 psi, more preferably at least 20%, further preferably at least 30%, most preferably at least 40%; (b) at least 10% at a spray pressure of 40 psi, more preferably at least 20%, further preferably at least 30%, most preferably at least 40%; and/or (c) at least 10% at a spray pressure of 60 psi, more preferably at least 20%, further preferably at least 30%, most preferably at least 40%.

In the form of a distribution of particle sizes, the spray droplet would have a median volume particle/droplet diameter value. It will be understood that the median volume particle diameter refers to the equivalent spherical diameter corresponding to the point on the distribution which divides the population exactly into two equal halves. It is the point which corresponds to 50% of the volume of all the particles, read on the cumulative distribution curve relating volume percentage to the diameter of the particles i.e. 50% of the distribution is above this value and 50% is below. This value is referred to as the 'D(v,0.5)'.

Preferably the spray drift reducing material tested herein increases the D(v,0.5) value. The increase in the D(v,0.5) of the spray will therefore be understood as an increase in the spray droplet median volume particle/droplet diameter value compared to an analogous agrochemical composition which does not comprise a spray drift reducing material. The spray drift reducing material may provide a percentage increase of the D(v,0.5) value of at least 2%, more preferably at least 5%, most preferably at least 10%, preferably at a spray pressure of 40 psi.

In addition, the spray drift reducing material tested herein suitably provides a percentage reduction of droplets having a size of greater than 500 μm, of (a) at least 5%, preferably at a spray pressure of 30 psi, more preferably at least 10%; (b) at least 5%, preferably at a spray pressure of 40 psi, more preferably at least 10%; and/or (c) at least 5%, preferably at a spray pressure of 60 psi, more preferably at least 10%.

The spray drift reducing material, by reducing the amount of undesired small and large droplets, may change the droplet size distribution of the sprayed agrochemical composition.

The width of the droplet size distribution may be defined as the 'span' which is a measure of the width of the distribution based on the 10%, 50% and 90% quantile. Span (measured in μm) may be defined as follows:

Span=$D(v,0.9)-D(v,0.1)$ and relative span may be defined as follows:

$$\text{Span} = \frac{D(v, 0.9) - D(v, 0.1)}{D(v, 0.5)}$$

The volume median diameter D(v,0.5) is as defined herein. 'D(v,0.9)' and 'D(v,0.1)' values are the equivalent spherical diameter corresponding to 90% or 10% respectively of the volume of all the particles, read on the cumulative distribution curve relating volume percentage to the diameter of the particles, i.e. they are the points where 10% or 90% of the distribution is above this value and 90% or 10% are below the value respectively.

The relative span value represents the width of the particle size distribution of the spray droplets, and therefore how defined the distribution is around the median particle size value. The use of a spray drift reducing material may result in the spray droplet size distribution being more narrowly defined around the desired range.

The spray drift reducing material tested herein preferably provides a percentage reduction in relative span of, (a) at least 4% at a spray pressure of 30 psi, more preferably at least 8%, further preferably at least 10%, most preferably at least 12%; (b) at least 4% at a spray pressure of 40 psi, more preferably at least 8%, further preferably at least 10%, most preferably at least 12%; and/or (c) at least 4% at a spray pressure of 60 psi, more preferably at least 8%, further preferably at least 10%, most preferably at least 12%.

It will be understood that, unless stated otherwise, all preferred values of particle and droplet size stated herein are with reference to a AIXR11004 spray nozzle with glyphosate and ammonium sulphate based formulations, where the spray angle is 110° and the flow rate is 0.4 US gallons per minute. Values for spray drift reduction are with reference to an agrochemical spray composition comprising 0.25 wt. % of a spray drift reducing material. Fluid pressure for spray testing is at 40 psi unless stated otherwise. Droplet size values are with reference to measurement by laser light scattering using a Sympatec Helos Vario KF laser sizing system with the spray plume being directed vertically down and traversed across the instrument laser beam, and averaged over the width of the spray (spray plume).

In one embodiment, the spray drift reducing material tested herein is a fatty acid ester of a $C_3$ to $C_8$ polyol or oligomers thereof. Suitable polyols include ethylene glycol, isosorbide, 1,3-propanediol, propylene glycol, trimethylolpropane, trimethylolethane, glycerol, triglycerol, erythritol, threitol, pentaerythritol, sorbitan, arabitol, xylitol, ribitol, fucitol, mannitol, sorbitol, sucrose, maltose, galactitol, iditol, inositol, volemitol, isomalt, maltitol, or lactitol. The fatty acids used to form the ester are preferably selected from $C_{10}$ to $C_{30}$ fatty acids, more preferably $C_{12}$ to $C_{24}$ fatty acids, particularly $C_{14}$ to $C_{22}$ fatty acids, further preferably $C_{16}$ to $C_{22}$ fatty acids. The fatty acids may be a fatty acid mixture obtained from natural fats and oils, e.g. canola oil, sunflower oil, soybean oil, olive oil, cotton seed oil, grape seed oil, peanut oil, rapeseed oil, safflower oil, cottonseed oil, or tall oil. Preferably canola oil, safflower oil, soybean oil, or tall oil are used. Alternatively, purified fatty acids may be used.

Suitable specific fatty acid esters include sorbitan monooleate, glycerol mono-oleate, sorbitan sesquioleate, sorbitan di-oleate, sorbitan tri-oleate, glycerol ester of tall oil or diglycerol ester of tall oil, glycerol ester of canola oil or diglycerol ester of canola oil, glycerol ester of safflower oil or diglycerol ester of safflower oil, glycerol ester of soy oil or diglycerol ester of soy oil, di-glycerol oleate, tri-glycerol oleate, di-glycerol isostearate, or tri-glycerol isostearate.

In another embodiment, the spray drift reducing material tested herein comprises an alkoxylated, preferably ethoxylated, sorbitan fatty acid ester. The alkoxylated sorbitan fatty acid ester may be obtained by alkoxylation of the corresponding sorbitan fatty acid ester. Suitable sorbitan fatty acid esters include sorbitan monolaurate, sorbitan monopalmilate, sorbitan monostearate, sorbitan tristearate, sorbitan sesquioleate, sorbitan monooleate and sorbitan trioleate. The sorbitan fatty acid esters are preferably alkoxylated using ethylene oxide and/or propylene oxide, more preferably with ethylene oxide. The esters are preferably alkoxylated with not more than 50 moles, more preferably in the range from 1 to 30 moles, particularly 3 to 25 moles, and especially 4 to 20 moles of alkylene oxide, preferably ethylene oxide. The carbon chain length of the fatty acid used to form the ester preferably comprises in the range from 8 to 24, more preferably, 10 to 22, particularly 12 to 20, and especially 16 to 18 carbon atoms.

Suitable materials are known as polysorbates which include polyoxyethylene versions of sorbitan monolaurate, sorbitan monopalmilate, sorbitan monosterate, sorbitan tristerate, sorbitan sesquioleate, sorbitan monooleate, and sorbitan trioleate. Specific examples of suitable polysorbates include polysorbate 20, 21, 40, 60, 61, 65, 80, 81 and 85.

The spray drift reducing material tested herein may also comprise a vegetable oil, such as those selected from the group consisting of soybean oil, canola oil, sunflower oil, safflower oil, cottonseed oil, coconut oil, palm oil, palm kernel oil, rapeseed oil, olive oil, and mixtures thereof. Canola oil is a particularly preferred component of a spray drift reducing material tested herein.

In one embodiment, the spray drift reducing material tested herein is a composition comprising, consisting essentially of, or consisting of at least one alkoxylated sorbitan fatty acid ester described herein and at least one vegetable oil, preferably canola oil. The spray drift reducing material tested herein may also comprise a modified vegetable oil described herein, preferably modified canola oil. The vegetable oil may be modified by reacting with a fatty acid, preferably having a carbon chain length in the range from 8 to 24, more preferably, 10 to 22, particularly 12 to 20, and especially 16 to 18 carbon atoms.

In one embodiment, the spray drift reducing material tested herein is a composition comprising, consisting essentially of, or consisting of at least one alkoxylated sorbitan fatty acid ester described herein, at least one vegetable oil, preferably canola oil, and at least one modified vegetable oil, preferably canola oil which has been reacted with a fatty acid.

The invention is illustrated by the following non-limiting examples.

EXAMPLES

Spray droplet particle size and particle size distribution was measured in the recirculating wind tunnel apparatus described herein for compositions containing different concentrations of a spray reducing material (SRM) comprising a polyoxyethylene sorbitan fatty acid ester diluted in deionised water. During operation of the recirculating wind tunnel a column of air was directed down through the spray chamber which measured 48 in (wide) by 30 in (deep) by 48 in (tall). Solutions were prepared by percent weight spray reducing material in deionised water and sprayed from a TeeJet 8002 flat fan nozzle at 40 psi with wind moving vertically downward along the spraying axis at 15 mph. Spent spray solution was removed using a mist eliminator. Spray droplets were detected and sizes measured with a Sympatec HELOS-KR laser diffraction system equipped with an R7 lens that intersects the spray perpendicular to the spraying axis approximately 10 inches below the nozzle exit. To ensure the full droplet size distribution was detected, data was collected continually as the nozzle traversed across the laser sampling region at 8 in/s. Traverse of the spray head extended 50 inches on either side of the laser. The results are given in Table 1 and represent the average and standard deviation of at least four measurements of the droplet size distribution.

TABLE 1

Spray droplet size distribution data.

| % w/w SRM | D(v, 0.1)/μm | D(v, 0.5)/μm | D(v, 0.9)/μm | % < 105 μm | % < 150 μm | % > 400 μm |
|---|---|---|---|---|---|---|
| 0 | 97.14 ± 0.55 | 217.08 ± 1.21 | 368.61 ± 10.08 | 12.06 ± 0.14 | 25.72 ± 0.21 | 6.75 ± 1.10 |
| 0.125 | 122.27 ± 1.06 | 238.99 ± 1.25 | 370.93 ± 2.03 | 6.25 ± 0.23 | 17.42 ± 0.38 | 6.29 ± 0.20 |
| 0.25 | 123.63 ± 0.52 | 241.40 ± 0.23 | 377.45 ± 1.32 | 6.12 ± 0.10 | 16.81 ± 0.17 | 6.98 ± 0.15 |
| 0.50 | 127.26 ± 0.71 | 245.86 ± 2.84 | 392.69 ± 22.53 | 5.67 ± 0.09 | 15.42 ± 0.27 | 8.77 ± 2.70 |
| 0.625 | 123.30 ± 4.49 | 241.04 ± 4.83 | 390.03 ± 20.28 | 6.38 ± 0.79 | 16.67 ± 1.49 | 8.67 ± 2.50 |

The above results show the effect of the presence of the drift reducing material on spray droplet particle size and particle size distribution.

The invention claimed is:
1. A method of analyzing spray particulates in a wind tunnel comprising an airflow system and a spray chamber comprising a transparent sidewall, wherein the airflow system is capable of delivering air vertically down through the spray chamber, said method comprising:
spraying the spray particulates from a spray tip; and
analyzing the spray particulates through the transparent sidewall, wherein the cross-sectional area of the spray chamber is greater than the cross-sectional area of the airflow system, and wherein the wind tunnel is capable of switching from a spatial particle size measurement technique to a temporal particle size measurement technique with no change in configuration.

2. The method according to claim 1 wherein at least one dimension of the spray chamber, preferably the width, is at least 2 times greater than that of the airflow system.

3. The method according to claim 1 wherein any spatial measurements are made using a laser by a diffraction technique, and/or any temporal measurements are made using a laser by an image analysis and/or phase doppler technique.

4. The method according to claim 3 wherein the spatial measurements comprise spray particle size and/or spray particle distribution measurements.

5. The method according to claim 3 wherein the temporal measurements comprise (i) spray particle size and/or spray particle size distribution measurements, and/or (ii) spray particle velocity and/or spray particle velocity distribution measurements.

6. The method according to claim 1 wherein the spray composition comprises a spray drift reducing material.

7. The method according to claim 6 wherein the spray drift reducing material provides a percentage reduction of droplets, (i) having a size of less than 150 μm of at least 20% at a spray pressure of 30 psi, and/or (ii) having a size of less than 105 μm of at least 10% at a spray pressure of 30 psi.

8. The method according to claim 1 wherein the spray composition comprises an agrochemical active selected from the group consisting of insecticides, fungicides, and herbicides.

9. The method according claim 8 wherein the agrochemical active is a herbicide selected from the group consisting of 2,4-dichlorophenoxyacetic acid (2,4-D), atrazine, dicamba as benzoic acid, glyphosate, glufosinate, imazapic as imidazolinone, metolachlor as chloroacetamide, picloram, clopyralid, triclopyr as pyridinecarboxylic acids or synthetic auxins, the respective water soluble salts and esters thereof, and mixtures thereof.

10. The method according to claim 1 wherein the spray composition comprises an alkoxylated sorbitan fatty acid ester.

11. The method according to claim 1 wherein the spray composition comprises at least one vegetable oil, preferably canola oil.

12. The method according to claim 1 wherein the spray composition comprises at least one modified vegetable oil, preferably modified canola oil.

13. A wind tunnel comprising an airflow system and a spray chamber, wherein the airflow system is capable of delivering air vertically down through the spray chamber, and the spray chamber comprises at least one transparent sidewall and an arm adapted to receive a spray tip which is capable of spraying particulates vertically down into the spray chamber, wherein the cross-sectional area of the spray chamber is greater than the cross-sectional area of the airflow system, and wherein the wind tunnel is capable of switching from a spatial particle size measurement technique to a temporal particle size measurement technique with no change in configuration.

14. The wind tunnel according to claim 13 wherein a laser is positioned on the outside of the at least one transparent sidewall.

15. The wind tunnel according to claim 13 wherein the width of the spray chamber is greater than the width of the airflow system.

16. The wind tunnel according to claim 15 wherein the width of the spray chamber is at least 2 times greater than the width of the airflow system.

17. The wind tunnel according to claim 13 wherein the spray chamber comprises at least two internal partial side walls containing a gap through which the spray arm is capable of passing through.

18. The wind tunnel according to claim to 17 wherein the internal partial side walls are removable.

19. The wind tunnel according to claim 13 wherein the airflow system is capable of delivering air horizontally across the spray chamber.

20. The wind tunnel according to claim 13 wherein the arm comprising the spray tip is capable of traversing the spray chamber.

* * * * *